(12) United States Patent
Cheriton

(10) Patent No.: US 7,340,597 B1
(45) Date of Patent: Mar. 4, 2008

(54) METHOD AND APPARATUS FOR SECURING A COMMUNICATIONS DEVICE USING A LOGGING MODULE

(75) Inventor: David R. Cheriton, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 860 days.

(21) Appl. No.: 10/664,551

(22) Filed: Sep. 19, 2003

(51) Int. Cl.
*G06F 1/24* (2006.01)

(52) U.S. Cl. .................. 713/100; 713/160; 713/164; 713/168; 713/193

(58) Field of Classification Search ............. 713/100, 713/160, 164, 168, 193
See application file for complete search history.

(56) References Cited

U.S. PATENT DOCUMENTS

| | | | | |
|---|---|---|---|---|
| 5,018,079 A | * | 5/1991 | Shukunami et al. | 358/1.6 |
| 5,197,128 A | * | 3/1993 | Campbell et al. | 710/56 |
| 5,293,466 A | * | 3/1994 | Bringmann | 358/1.15 |

* cited by examiner

*Primary Examiner*—Thomas R. Peeso
(74) *Attorney, Agent, or Firm*—Campbell Stephenson LLP

(57) ABSTRACT

A logging module is disclosed. A communications device can include, and so be made secure through the use of, the logging module. The logging module is configured to communicate information regarding a change to a configuration of a subsystem of the communications device.

110 Claims, 12 Drawing Sheets

METHOD AND APPARATUS FOR SECURING A COMMUNICATIONS DEVICE USING A LOGGING MODULE

BACKGROUND OF THE INVENTION

1. Field of the Invention

This invention relates to the field of information networks, and more particularly to a method and apparatus for securing a communications device using a logging module.

2. Description of the Related Art

Today's networks are an efficient and effective platform for providing communications between large numbers of computing devices. Each device on the network has easy access to the information and services provided by the other networked devices. The convenience of access, however, significantly increases the risk of an outside attack on one or more of these network devices. Network security is therefore of increasing importance.

To date, most of the functionality provided by network devices and other such communication systems is implemented in software, particularly in the control plane of such systems, with hardware simply providing for the acceleration of performance-critical functions. While software has some key advantages over hardware (e.g., flexibility, upgradeability and lower cost), software suffers from several disadvantages with regard security, including the ease with which software may be altered and the difficulty encountered in verifying software.

The ease with which software can be altered can allow an attacker to compromise restrictions on access to the network device (e.g., router), and so modify the software to defeat the network device's overall operation. This is particularly dangerous because the attacker can then use this compromised network device as an agent to proceed with further compromise of the network's security. Using an initial security hole as a stepping stone to further compromise a network is a common strategy in this regard.

Moreover, the flexibility/complexity of software typically results in an overall lower degree of "verification" than hardware. In fact, the term used in the software arts is "testing" (and not "verification"). This inability to fully exercise such systems portends the risk of unknown weaknesses, which can then be exploited by those wishing to subvert such systems' operations. The ease with which software can be altered also typically implies that any weak point in the software that permits the software to be compromised means that even well-tested software components can be modified to defeat security measures intended for their protection.

In contrast, functionality implemented in hardware cannot be easily altered by an attacker, save for an attacker having physical access to the system. Even then, it is extremely difficult to make such alterations without disrupting the operation of such equipment. Moreover, hardware is conventionally subjected to far more complete and rigorous verification. An equipment manufacturer is strongly incentivized to do so because of the enormous cost associated with the replacement of design-defective hardware in the field (or even late in the production and manufacturing cycle). However, despite these advantages, hardware implementations are also subject to a number of limitations, including being limited to relatively simple functionality and the need for configuration using software.

Hardware is typically limited to relatively simple functionality. In particular, it is impractical to implement complex security control mechanisms and protocols in hardware, at least in the sense of hard-coded state machines, special memories, registers and the like. Moreover, hardware is conventionally designed to be driven from configuration registers and tables that are written by software, so compromised software can effectively compromise hardware operations as well.

Thus, security features are continuously being developed and implemented to restrict access by unauthorized entities, and so protect such network devices, while maintaining ease of access by authorized entities. Unfortunately, many of the security solutions deployed to secure network devices are configurable via the network. For example, many such solutions are implemented in software or firmware. Though easy access to the configuration of security devices is convenient, this access can significantly undermine the effectiveness of the security device. An attacker can, for example, disable a security device by changing its configuration and then proceed to attack the now-defenseless network device. As will be appreciated, any weak link in the security chain can thus put the entire network at risk.

What is needed, therefore, is a mechanism to leverage the security properties of a system's hardware, and in so doing, improve security of the system (e.g., network device), without placing unrealistic demands on the system's hardware, either in terms of complexity or restricted configurability. Preferably, such a mechanism is itself inaccessible or (substantially) non-configurable, such that an attacker cannot compromise the security of the system. In addition, the security solution should be simple enough to implement cost-effectively.

SUMMARY

In one embodiment, a communications device is disclosed. The communications device includes a logging module. The logging module is configured to communicate information regarding a change to a configuration of a subsystem of the communications device. In certain aspects of this embodiment, the communications device further comprises the subsystem, with the logging module being coupled to the subsystem. Moreover, in other aspects of this embodiment, the logging module is further configured to detect the change.

In another embodiment, a method for securing a communications device using a logging module is disclosed. The method includes detecting a change in a configuration of a subsystem of a communications device, and communicating information regarding the change. In certain aspects of this embodiment, the method further includes determining the configuration.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

DESCRIPTION OF THE DRAWINGS

The present invention may be better understood, and numerous objects, features, and advantages made apparent to those skilled in the art by referencing the accompanying drawings.

The use of the same reference symbols in different drawings indicates similar or identical items.

DETAILED DESCRIPTION OF THE INVENTION

Figure 1:
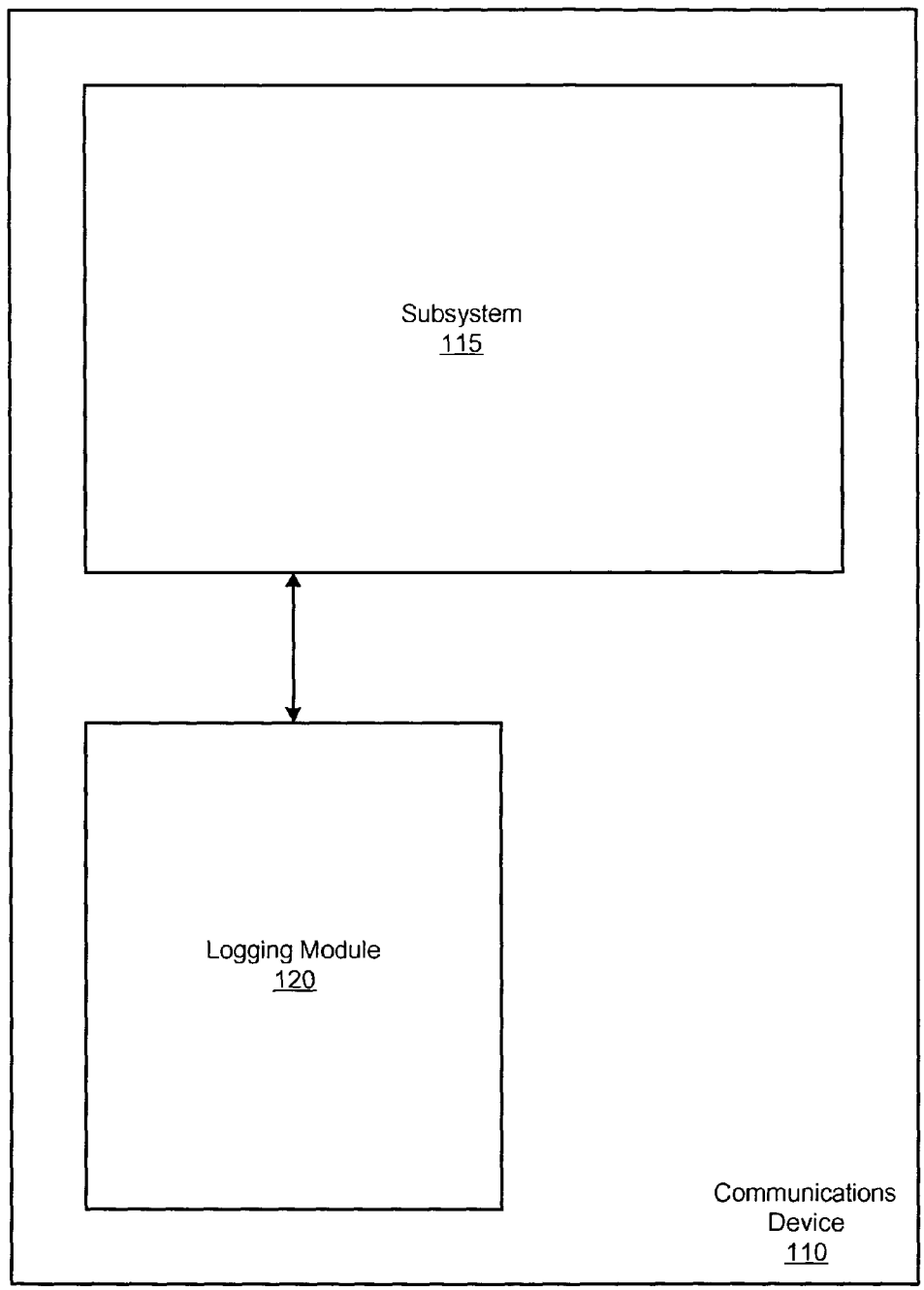
FIG. 1 is a block diagram illustrating a communications device that incorporates embodiments of the present invention.

The following is intended to provide a detailed description of an example of the invention and should not be taken to be limiting of the invention itself. Rather, any number of variations may fall within the scope of the invention which is defined in the claims following the description.

Introduction

The invention provides a method and apparatus for securing a device using a logging module having restricted configurability. The logging module is configured to monitor a configuration of the device and is further configured to indicate a change to the configuration. The device is restricted from changing a configuration of the logging module.

In one embodiment, a logging module is implemented (preferably, primarily in hardware) and a packet generation facility is provided in a network device. The logging module and packet generation facility preferably offer restricted software configurability and control. The logging module and packet generation facility transmit packets reporting configuration actions on the hardware. The device is designed such that software operating on the device is unable to compromise the reporting of the device's configuration (e.g., by altering the logging module's configuration). This can be achieved, for example, by restricting (or substantially restricting) the software's access to the logging module.

One or more network security monitors are then able to receive these hardware-generated logging packets, and so, to monitor the network device's configuration, in order to detect any compromise of the network device. The network security monitors can be designed to report the compromise to a network administration facility, if the now-compromised network device appears to be misconfigured. In fact, the network security monitors can also be designed to disconnect the now-compromised network device from the network.

In one embodiment, a network device configuration logging protocol is provided, as well as an assigned internet protocol (IP) and Ethernet multicast address and protocol type. The protocol specifies a sequence number plus representation of log records describing configuration operations performed on the network device. For example, each packet can consist of a sequence number plus a sequence of log records, with each log record representing a configuration register or table entry, and the information written to that table entry.

Each network device supporting such a protocol includes a hardware component (e.g., a logging module) that generates a log record for each write operation to a hardware configuration register or table. This hardware component then stores each such log record into a packet frame labeled with the next sequence number, and transmits the packet once it is full. Alternatively, the hardware component can be designed to transmit the packet within some timeout period. The packet is transmitted with the address and protocol type assigned to this protocol. The hardware component further includes a mechanism that prevents the software running on the network device from transmitting any logging protocol packets (e.g., packets having this protocol type and address). Any such attempts are dealt with by dropping the packet, and generating a log message (and in so doing, treating this action as an attempt to change the network device's configuration). The hardware component can further include a mechanism that prevents the network device from forwarding any logging protocol packet that specifies the given network device's address as the packet's source address. A reset of the hardware should cause the sequence number to be reset (e.g., to zero), and should be logged as a configuration change.

The logging protocol can also be designed to employ a periodic "heartbeat." This can be implemented as standard procedure, or simply in the absence of reconfiguration activity. Such a heartbeat can be generated by the hardware, or the software can be designed to cause such by periodically writing to a null configuration register, for example.

In one embodiment, a network security monitor maintains the identity of each network device incorporating the logging mechanism, and is connected directly or indirectly through the network to each such device. The network security monitor receives logging protocol packets by subscribing to the associated multicast address. On reset of a given network device, the network security monitor synchronizes with the state of the hardware on that network device (and its sequence number) when the network security monitor receives a log record of a reset operation. It is assumed that a hardware reset forces a network device to a known state. Once the network security monitor receives information regarding the reset, the network security monitor can track the configuration actions of the software on the network device. In particular, when the network security monitor subscribes to this logging protocol address, the network security monitor can track configuration actions at the network device. Subsequently, the network security monitor can detect changes to the hardware configuration (and any unaccounted for logging packets) by examining the sequence number of logging packets received.

A network device directly connected to a network security monitor is similarly protected. One or more missing numbers in the sequence number space of the logging packets received by the network security monitor from the network device indicates the possibility of the network device's having been compromised.

Software executing on such a directly-connected network device cannot forge a logging packet because the hardware component prevents the generation of such forgeries. It is assumed that, in order to preclude the forgery of packets on the link between the network device and the network security monitor, the attacker is not physically able to compromise the link. This is a reasonable assumption, as such is commonly the case (e.g., either the attacker is not physically present, the link is physically protected, the link is encrypted (e.g., in the case of wireless or other technologies) or the like). Typically, the network security monitor is connected through an internal wireline link so this is not an issue.

For an indirectly-connected device, the network security monitor first ensures the integrity of directly-connected devices, and then the devices directly connected through these first hop devices, and so on. The network security monitor has the ability to receive log records generated by a network device configured (e.g., by configuring its forwarding tables) to implement the forwarding of logging packets. This allows the network security monitor to ensure that each network device is properly configured to forward logging packets in an appropriate manner, as requested by the network security monitor.

In particular, in response to a request to receive the logging traffic, the network security monitor should receive one or more log records from each affected network device, indicating that the given network device has configured its multicast parameters to forward the logging packet traffic towards the network security monitor. Similarly, the network security monitor can observe (via the logging protocol) configuration actions such as a network device setting its source IP and MAC address.

The network security monitor can be, for example, a special network device designed to be highly resistant to attack, possibly with a separate command and reporting connection to the network operations center. This can also be implemented as a module that runs as a feature linecard on various network devices (e.g., routers). Alternatively, this monitor can run as a software module within a network devices, simply receiving logging packets from its neighbors. In such a case, the monitoring should be replicated on several network devices, in order to increase the difficulty encountered by an attacker in attempting to compromise a sufficient number of such modules simultaneously, and so compromise the network's security (specifically, attack detection).

Moreover, a network implementing the present invention can be designed to defend against compromised nodes reporting false attacks (in order to cause portions of the network to be disconnected) by maintaining a number of network security monitors, and relying on the majority being accurate against a compromised few. In any case, for reasons of fault-tolerance and security, it is preferable to employ multiple network security monitors. One embodiment of the present invention includes a "overlay" network of network security monitors that are redundant and use a separate authentication, control and reporting mechanism, such that it is effectively impossible for an attacker to compromise the monitoring and reporting performed by these network security monitors. It will be appreciated that the simplicity of the monitoring function relative to the full functionality of the typical network device makes such embodiments particularly feasible.

Example of an Apparatus for Securing a Communications Device

FIG. 1 is a block diagram illustrating an architecture of communications device 100 according to embodiments of the present invention. Communications device 100 includes a subsystem 115 and a logging module 120, which is coupled to subsystem 115. Logging module 120 determines a configuration of the subsystem 115, detects a change in the configuration of the subsystem 115, and indicates that the change has occurred. Logging module 120 should also be designed to substantially restrict subsystem 115 from changing a configuration of logging module 120 and to monitor any network data sent by subsystem 115.

Regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of communications device 100). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Example of an Apparatus for Securing a Network Device

Figure 2:
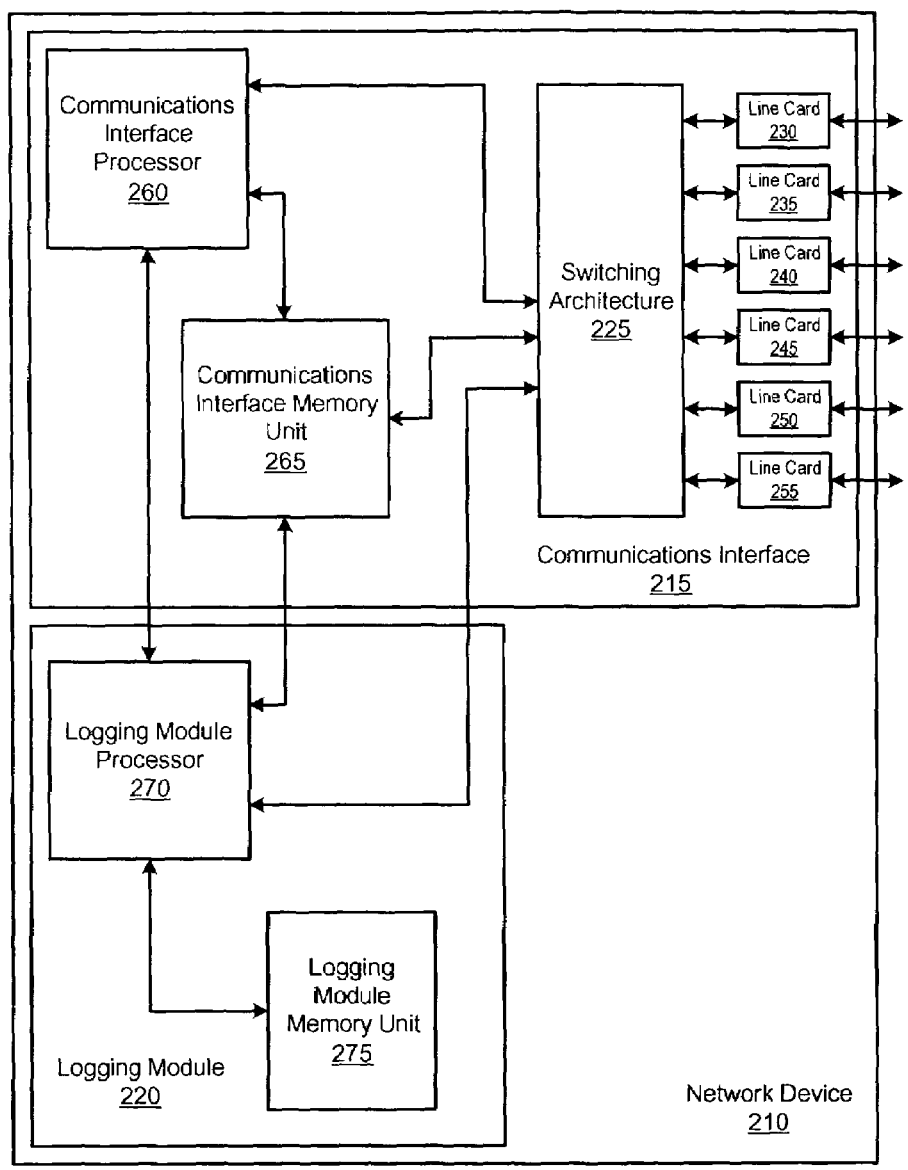
FIG. 2 is a block diagram illustrating a network device that incorporates embodiments of the present invention.

FIG. 2 is a block diagram illustrating a network device 210 that incorporates embodiments of the present invention. Network device 210 includes a communications interface 215 and a logging module 220 coupled to a communications interface 215. Communications interface includes line cards 230-255, a switching architecture 225, a communications interface processor 260, and a communications interface memory unit 265. Logging module 220 includes a logging module processor 270 and logging module memory unit 275.

Line cards 230-265 are configured to connect network device 210 to other network devices through one or more networks. Switching architecture 225 is coupled to line cards 230-265 and receives network data from and transmits network data to line cards 230-255. Communications interface processor 260 is coupled to switching architecture 225 and controls operations in communications interface 215. Communications interface processor 260 communicates with communications interface memory unit 265 and writes data to and reads data from communications interface memory unit 265. Communications interface memory unit 265 is configured to store, among other data, a configuration of communications interface 215.

A logging module processor 270 is configured to control operations of logging module 220. Logging module processor 270 is coupled to a logging module memory unit 275 and writes data to and reads data from the memory unit. Logging module memory unit 275 stores, among other data, a configuration of the logging module 220.

Logging module processor 270 is also coupled to communications interface processor 260 and substantially restricts communications interface processor 260 from modifying a configuration of logging module 220 by accessing logging module memory unit 275. Logging module processor 270 also monitors a configuration of communications interface 215 via its being coupled to communications interface memory unit 265. Logging module processor 270 detects a change in the configuration of communications interface 215 and indicates such change. This indication can take any of a number of forms, including a simple mechanism (e.g., an indicator lamp, a message to a display, a message to another network device, broadcast message to specially-configured security devices, or other such mechanisms). Moreover, in addition to monitoring the configuration of communications interface 215 (e.g., by recording write operations to communications interface memory unit 265), logging module processor 270 can be configured to block writes to communications interface memory unit 265. This might be the case, for example, in a situation in which such writes were occurring at a rate that exceeded the allowable log packet rate.

In one embodiment, logging module processor 270 is coupled to switching architecture 225 and broadcasts the change in the configuration of communications interface 215 to one or more security monitors on the network via switching architecture 225, and one or more of line cards 230-255. Logging module processor 240 can broadcast the change using a particular broadcast address and/or communications protocol, in order to prevent other modules from broadcasting using the same address and/or protocol. In one embodiment, logging module processor 270 monitors network traffic through switching architecture 225. Logging module processor 270 can then cause communications interface 215 to drop any outgoing packets of data not generated by the logging module processor that use the broadcasting address and communications protocol used by logging module processor 270.

In the preferred embodiment, an network device of this invention such as a switch or router handles a well-defined vast majority of the data path activity in hardware carefully separated from software, similar to that provided in the Catalyst 4K Supervisor III. Then, a review of the setting of the hardware configuration by the monitor can determine that a well-defined set of the packet traffic will transit this device without software being able to receive, modify or forge the traffic no matter how compromised it is. Conversely, a device that includes software on the packet datapath in all configurations provides relatively little value using this invention. Fortunately, performance demands tend to make the common case packet handling entirely in hardware.

As an extension of this embodiment, the hardware component further includes a fixed rate-limiting mechanism that limits the rate at which these logging packets can be generated. For example, rate may be limited to say 3 percent of the bandwidth on its ports or 3 Mbps on a 100 Mbps Ethernet port. Writing to a configuration register is disabled temporarily until the packet buffers of the hardware component are transmitted at the limited rate. The rate cannot be modified by software running on the device but only by physical modification of the device, such as changing a jumper on the supervisor card. This mechanism ensures that the logging traffic cannot be an high percentage of the overall traffic on the links.

As a further extension, the hardware component includes a digital signature capability as well as a private key embedded in hardware that is inaccessible to software. Then, each logging packet can be signed using standard digital signature and message integrity techniques (Message Authentication Code (MAC)) to allow the monitors to verify the logging packet is unmodified from that generated by the source host. This can be achieved by the hardware component computing a cryptographic MAC on the log packet, either relying on the private/public key of the generating device or else on a shared secret key that is exchanged or configured in the hardware component. In the latter case, it is also feasible to encrypt the log packets to provide confidentiality between the reporting nodes and the monitors. Note: this confidentiality is relatively weak and not viewed as critical to the security, because the secret key needs to be shared with the multiple monitors. Its provision is considered useful only to alleviate the potential discomfort to network administrators of otherwise effectively broadcasting configuration actions over the network in the clear.

Although a preferred invention is described as a hardware implementation, the configuration logging could be implemented in software with some benefits. For instance, an attacker may gain the password of a router and proceed to change the configuration yet have no ability to modify the software itself. In this case, even software configuration logging has benefits because the reconfiguration caused by the attacker would be reported. In this case, ideally, the command line interface (CLI) should not provide (at least in production mode) the ability to disable the configuration logging.

Figure 3:
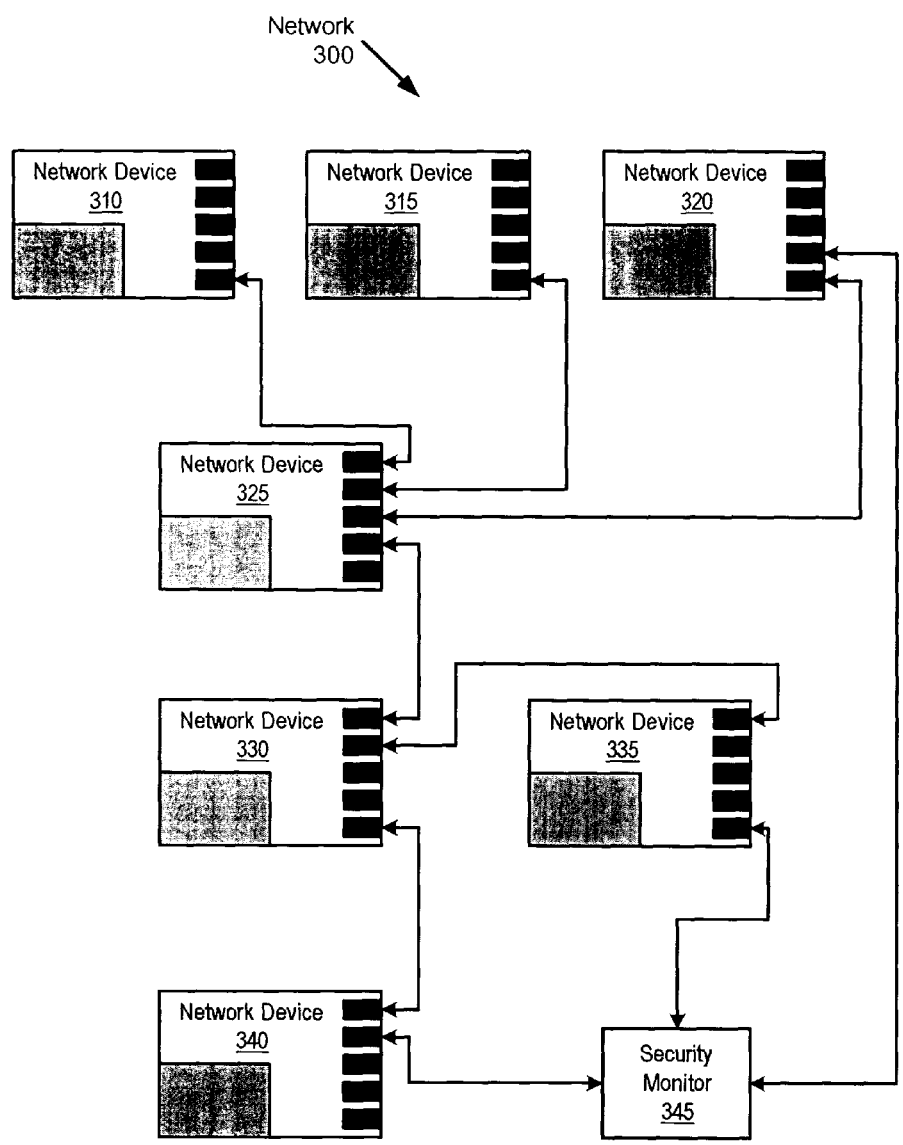
FIG. 3 is a block diagram illustrating a network of devices that incorporate embodiments of the present invention.

Example of a Network that Includes Network Devices Incorporating Embodiments of the Present Invention FIG. 3 is a block diagram illustrating a network of devices (a network 300) that incorporate embodiments of the present invention. Each of network devices 310-340 includes a logging module for monitoring any changes made to the configuration of the network devices. Security monitor 345 is also connected to network 300 and monitors the broadcasts of the logging modules of network devices 310-340. Additional security monitors can be connected to the network as well. One or more of network devices 310-340 can be configured to also act as a security monitor. Security monitor 345 analyzes the broadcasts from network devices 310-340 and determines a "trustworthy" status of a given network device. If security monitor 345 determines that a network device is not "trustworthy," security monitor 345 disconnects the device from the network and/or notify a network administrator.

Security monitor 345 can be connected directly to a network device (as is the case for network devices 320, 330, and 340) or can be connected to a network device indirectly (as is the case for network devices 310, 315, and 325). To determine a "trustworthy" status of a given network device that is not directly connected to the security monitor, a security monitor can also determine a "trustworthy" status of one or more devices along a path leading to the network device whose status is to be determined.

Advantages of a network designed in accordance with the present invention include the following. Such a network provides substantially enhanced security. An attacker cannot compromise the software on a network device implementing the present invention without the network device reporting the associated configuration changes, such that a network security monitor alerts the network administrator or the control systems designated to take action. In embodiments that implement the present invention in hardware, an attacker that does not have direct physical (and sophisticated) access to the network device is precluded from interfering with the logging/reporting of the configuration changes. Moreover, a network administrator can rely on the configuration logging to report the results of their actions in administering or reconfiguring a router at a CLI level, which ensures that these actions were actually effected.

A network (including the requisite network devices and network security monitor(s)) is relatively easy to implement. The simplicity of logging makes systems according to the present invention relatively inexpensive to implement in hardware. The hardware architectures of many of today's network devices are already well-positioned to generated the requisite logging packets as part of configuration changes, as well as to prevent software from generating these packets. It should be noted, however, that the configuration logging of the present invention can be implemented in software to some advantage, as well.

Moreover, the present invention provides this increase in security in a efficient manner, both from an implementation and management perspective. The basic scheme does not rely on secret keys that need to be refreshed periodically, but instead depends on making substantially impossible (at least in some practical sense) to hide the compromising of a configuration. The present invention also allows remote monitoring of devices (subject to the integrity of the links), allowing network administrators to monitoring network configuration activity from a central location, either directly or through an overlay of monitoring nodes.

Example of a Process for Securing a Communications Device

Figure 4:
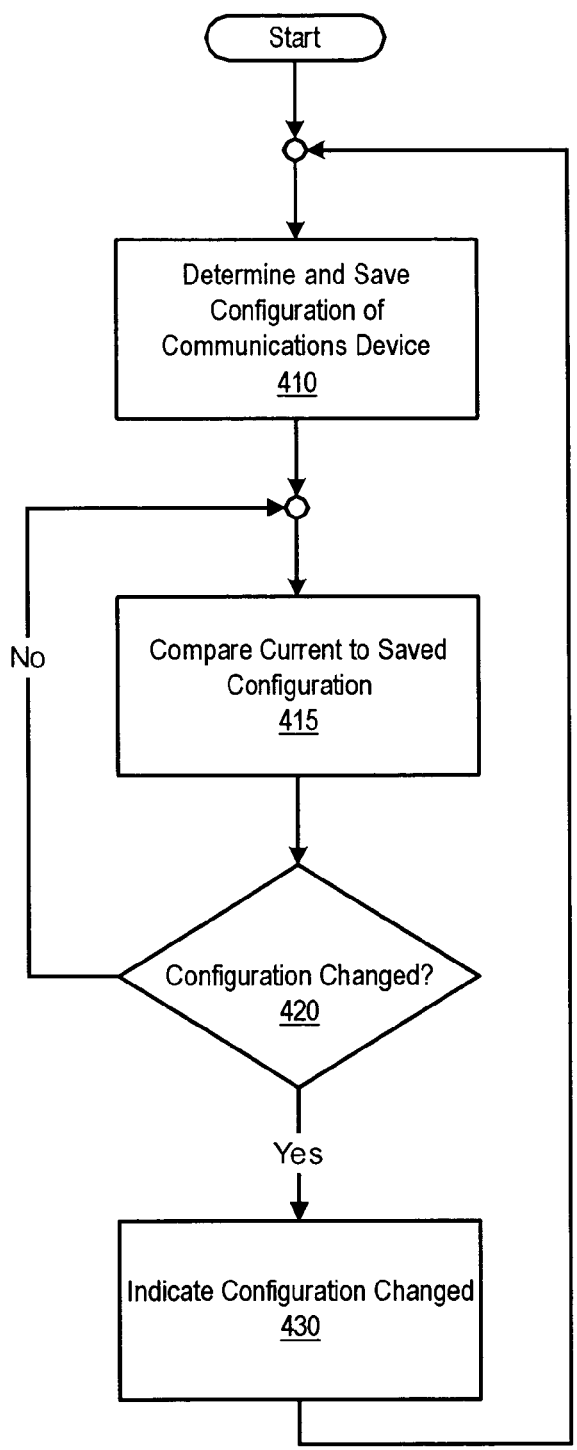
FIG. 4 is a flow diagram illustrating a process according to embodiments of the present invention.

FIG. 4 is a flow diagram illustrating a process according to embodiments of the present invention. The process begins with the determination and saving of the configuration of the communications device (step 410). Next, the configuration is determined again and compared to the saved configuration (step 415). A determination is then made as to whether the current configuration has changed as compared to the saved configuration (step 420). If the configuration has not changed (step 420), the configuration is again determined and compared to the saved configuration (step 415). If it is determined that the configuration has changed (step 420), the change in configuration of the communications device is indicated (step 430). Processing subsequently returns to step 410, where the new configuration is determined and saved, and the comparison process repeated.

As noted, FIG. 4 depicts a flow diagram illustrating a process according to an embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams depicted herein may be executed by a module (e.g., a software module) or a portion of a module or a computer system user. Thus, the above described method, the operations thereof and modules therefore may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. Optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, and the like; and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Example of a Process for Setting Up a Logging Module

Figure 5:
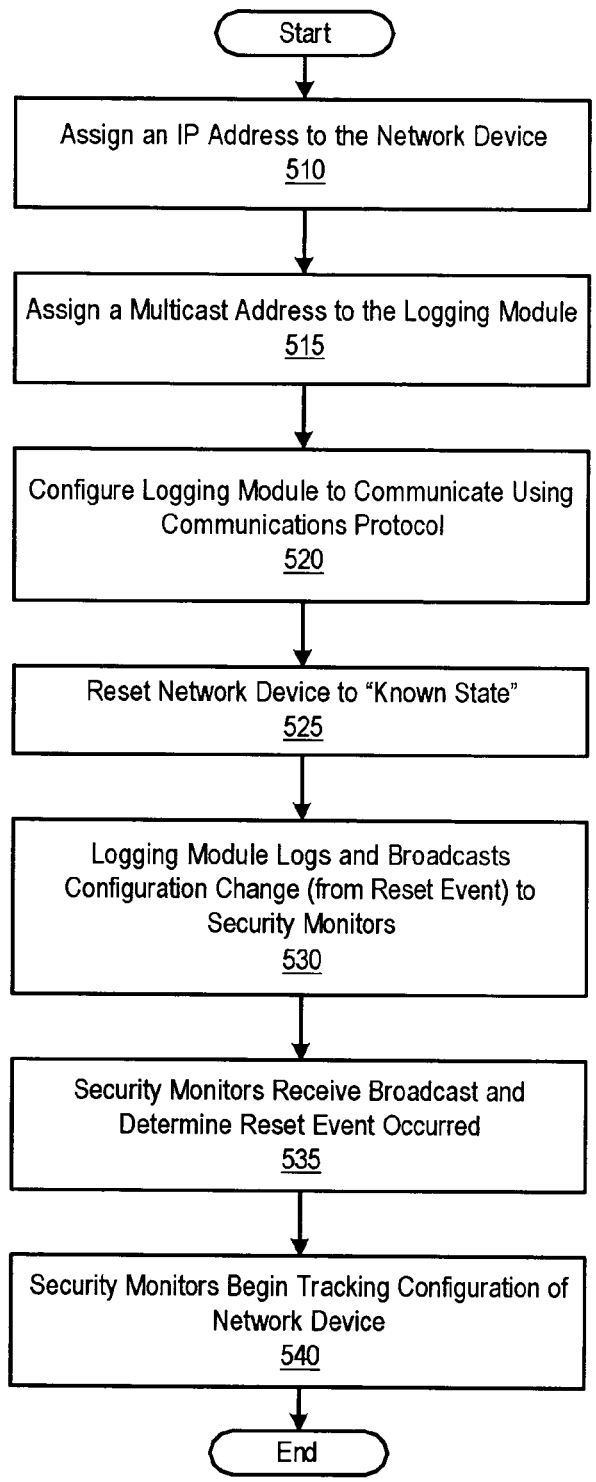
FIG. 5 is a flow diagram illustrating a process for setting up the logging module according to embodiments of the present invention.

FIG. 5 is a flow diagram illustrating a process for setting up the logging module according to embodiments of the present invention. At step 510, an address (e.g., an internet protocol (IP) address) is assigned to the network device. The IP address is used by the network device to communicate with other devices on the network. A multicast address is assigned to the logging module (step 515). The multicast address is used by the logging module to broadcast security information (such as changes in the configuration of the network device) to the one or more security monitors on the network. A security monitor must subscribe to this multicast address in order to monitor the logging module's broadcasts. The logging module is then configured to communicate using a particular communications protocol (step 520). In one embodiment, the logging module is configured to prevent any broadcasts, other than broadcasts by the logging module, using the same communications protocol as the logging module's communications to ensure that no other part of the network device attempts to assume the identity of the logging module.

At step 525, the network device is reset to a predetermined, "known" state. After receiving a reset command, a stored configuration in a memory unit of the networking device is loaded as the new, active configuration of the network device. At step 530, the logging module detects the loading of the known configuration as a change in the configuration of the logging module and logs and broadcasts the change to the one or more security monitors. At step 535, the security monitors receive the broadcast and determine that there has been a change in the network device's configuration and that the network device has been reset to a predetermined, known configuration. After the initial setup, at step 540, the security monitors begin tracking configuration changes of the network defines.

Figure 6:
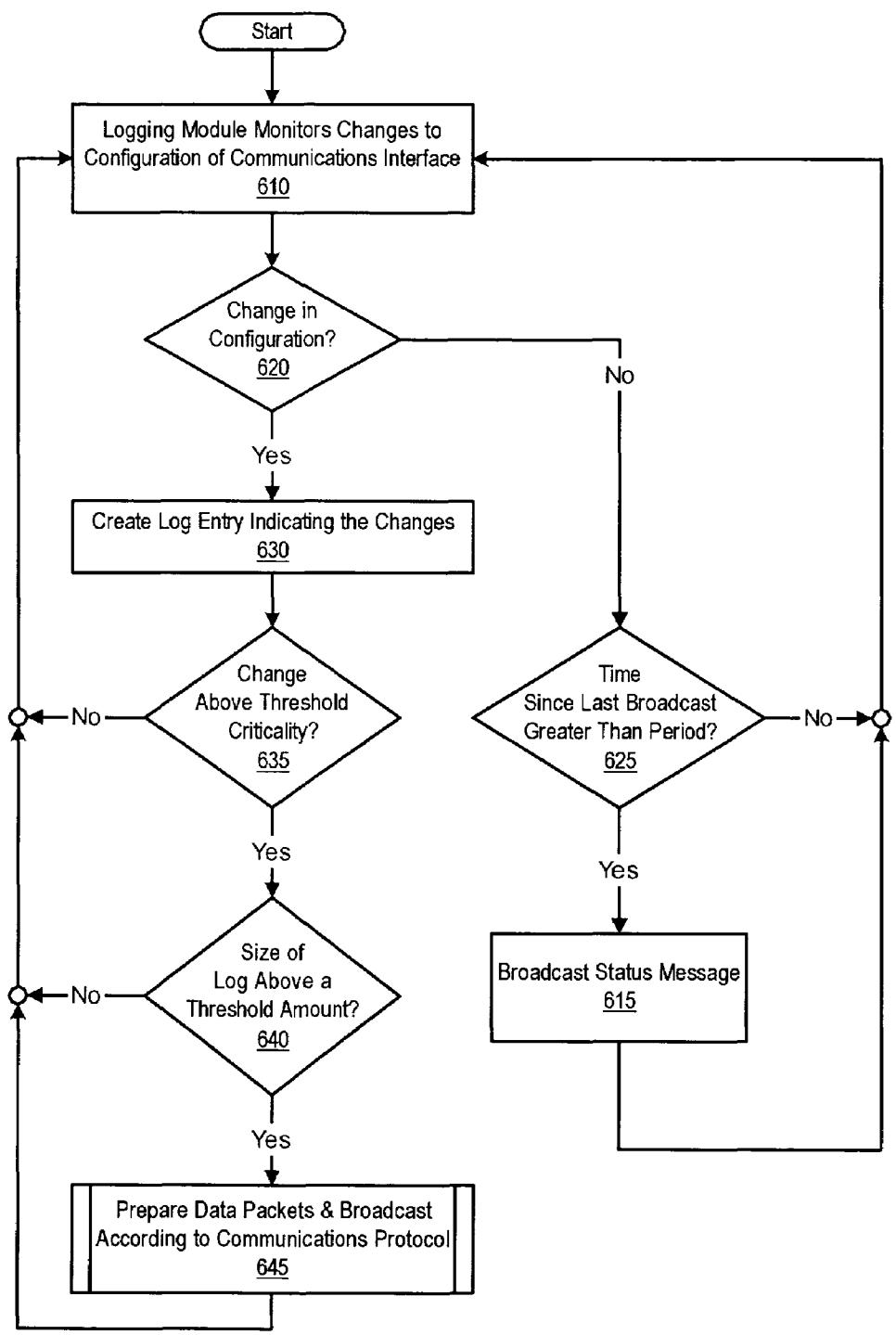
FIG. 6 is a flow diagram illustrating a process for monitoring and indicating changes to the configuration of a network device according to embodiments of the present invention.

Example of a Process for Monitoring and Indicating Changes to the Configuration of a Network Device FIG. 6 is a flow diagram illustrating a process for monitoring and indicating changes to the configuration of a network device according to embodiments of the present invention. At step 610, the logging module begins monitoring changes to the configuration of the communications interface. A determination is then made as to whether there has been a change in the configuration (step 620). If there has not been a change in the configuration (step 620), another determination is made as to whether the time since the last broadcasts was greater than the expected broadcast period (step 625). If the time since the last broadcasts is not greater than the broadcast period (step 625), the logging module continues the process of monitoring changes to the configuration of the communications interface (step 610). If the time since the last broadcast is greater than the broadcast period (step 625), a status message indicating that no changes have occurred is broadcast (step 615).

If a change in the configuration of the communications interface has occurred (step 620), a log entry is created by the logging module indicating the changes (step 630). A determination is then made as to whether the change that occurred is above a threshold criticality (step 635). If the change is not above a certain threshold criticality, processing resumes (step 610), where the logging module continues to monitor for changes in the configuration of the communications interface. If the change that occurred is above a threshold criticality (step 635), another determination is made as to whether the size of the generated log for broadcast is above a threshold amount (step 640). If the size of the generated broadcast log is not above a certain threshold (step 640), processing resumes (step 610), where the logging module continues to monitor for changes to the configuration of the communications interface.

If the amount of the size of the log is above a certain amount (step 640), the log is converted to data packets and is broadcast on the network according to the logging module's communications protocol (step 645). Processing then resumes (step 610), where the logging module continues to monitor for changes in the configuration of the communications interface.

An Example of a Process for Broadcasting Configuration Changes

Figure 7:
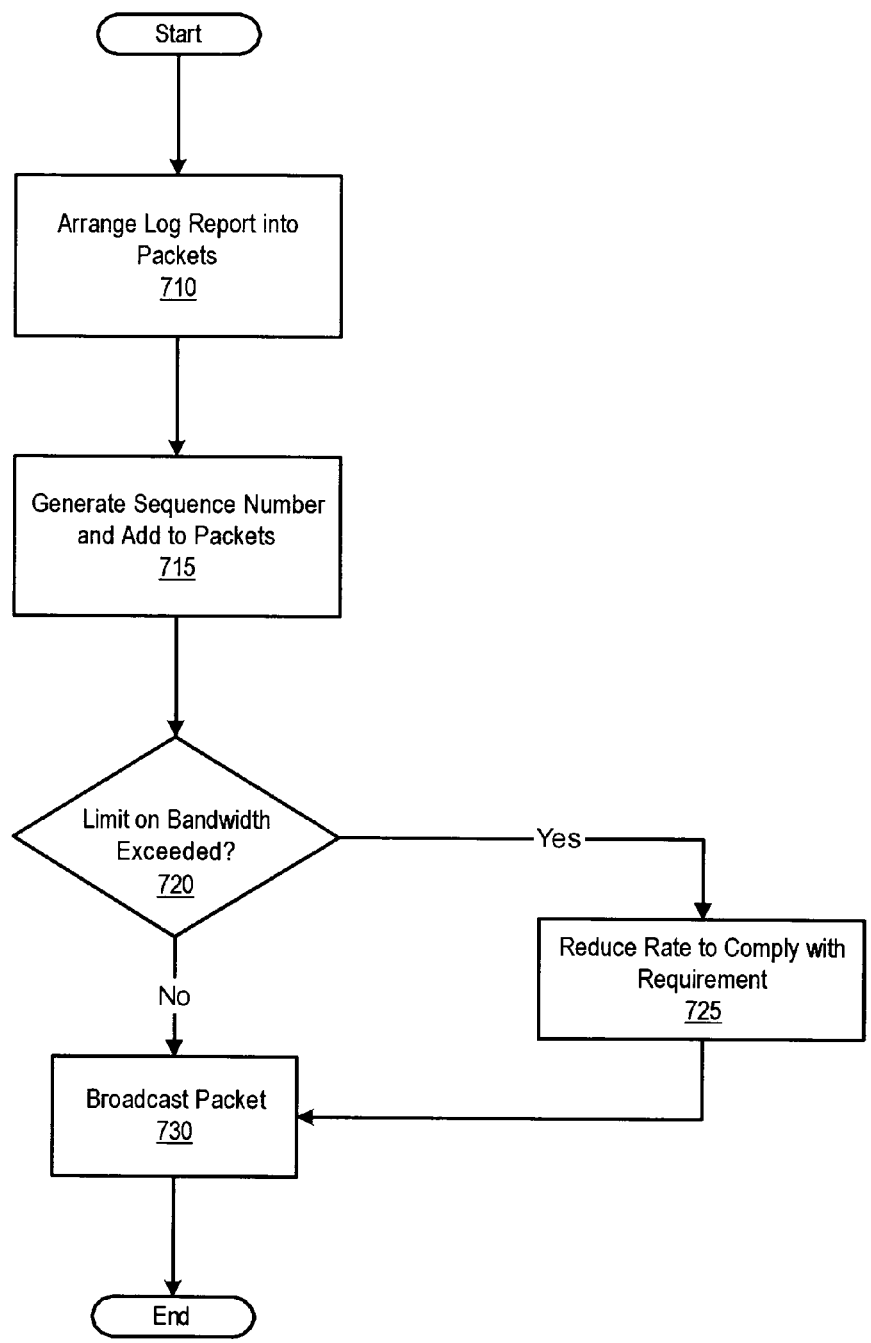
FIG. 7 is a flow diagram illustrating a process for broadcasting changes to the configuration of a network device according to embodiments of the present invention.

FIG. 7 is a flow diagram illustrating a process for broadcasting changes to the configuration of a network device according to embodiments of the present invention. The process begins by arranging the log report to be broadcast into data packets (step 710). The packets are created according to a communications protocol employed by the logging module. A new sequence number is then generated (step 715). In one embodiment, a sequence number is generated for each broadcast by the logging module. The security monitor can examine these numbers to determine whether the security monitor missed any broadcasts between the current and last broadcast the security monitor received.

A determination is then made as to whether a limit of the bandwidth used by the logging module for broadcasting has been exceeded (step 720). In one embodiment, a limit may exist on the amount of data the logging module can broadcast on the network to ensure that the logging module's broadcasts do not interfere with other network traffic. For example, broadcasting by the logging module may be limited to 5% of the total bandwidth of the network. If the limit on the bandwidth has been exceeded (step 720), the rate is reduced to comply with the bandwidth requirement (step 725). Typically, this will be accomplished by suspending further configuration updates, pending availability of additional memory space for tracking such configuration updates (e.g., after log packets are sent, ostensibly at the maximum rate). Processing subsequently continues (step 730). If the bandwidth limit has not been exceeded, the generated data packets are broadcast on the network (step 730).

Figure 8:
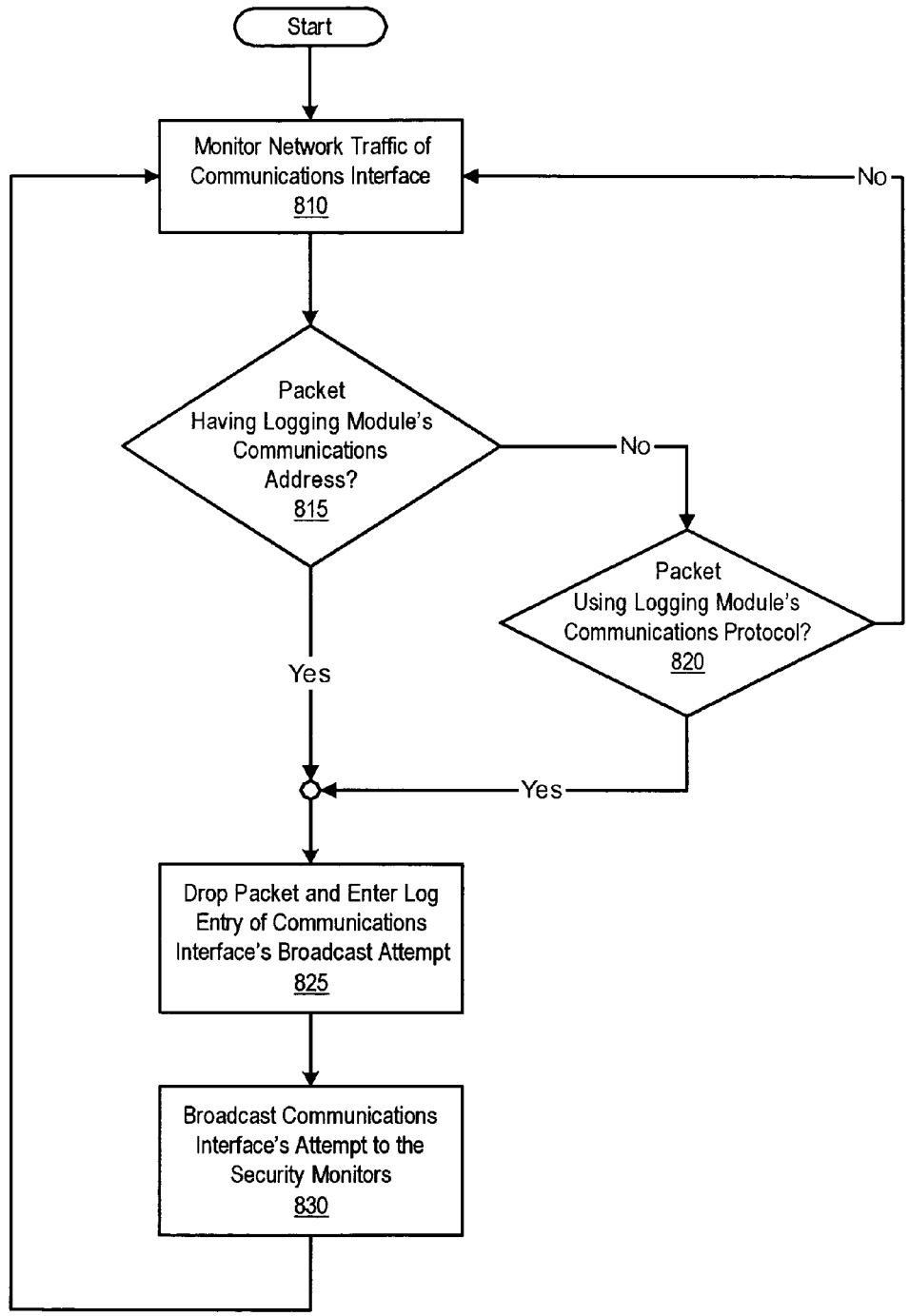
FIG. 8 is a flow diagram illustrating a process for restricting access to the configuration of the logging module by the communications interface.

An Example of a Process for Restricting Access to the Configuration of a Logging Module FIG. 8 is a flow diagram illustrating a process for restricting access to the configuration of the logging module by the communications interface. The logging module is configured to monitor the network traffic of the communications interface in order to prevent the communications interface from assuming the identity of the logging module by broadcasting using the logging module's communications (broadcast) address and/or the logging module's communications protocol. Processing begins with the logging module's monitoring of the communications interface's network communications (step 810).

A determination is then made as to whether the communications interface's network communications packets are using the logging module's communications address (step 815). If the communications interface has not attempted to broadcast using the logging module's communications address (step 815), another determination is made as to whether the communications interface has attempted to send packets using the logging module's communications protocol (step 820). If the packets are not being sent using the logging module's communications protocol (step 820), processing resumes (step 810), where the logging module continues to monitor the network traffic generated by the communications interface. If the packets are being sent using the logging module's communications protocol (step 820), the packets are dropped and a log entry is entered indicating the communications interface's attempt (step 825). Similarly, if the communications interface has attempted to transmit using the logging module's communications address (step 815), the packets are also dropped and a log entry entered indicating the communications interface's attempt (step 825). The log containing the attempt by the communications interface is then broadcast to the security monitors (step 830). Processing then resumes (step 810), where the logging module continues to monitor the network traffic generated by the communications interface.

An Example of a Process for Setting Up a Security Monitor

Figure 9:
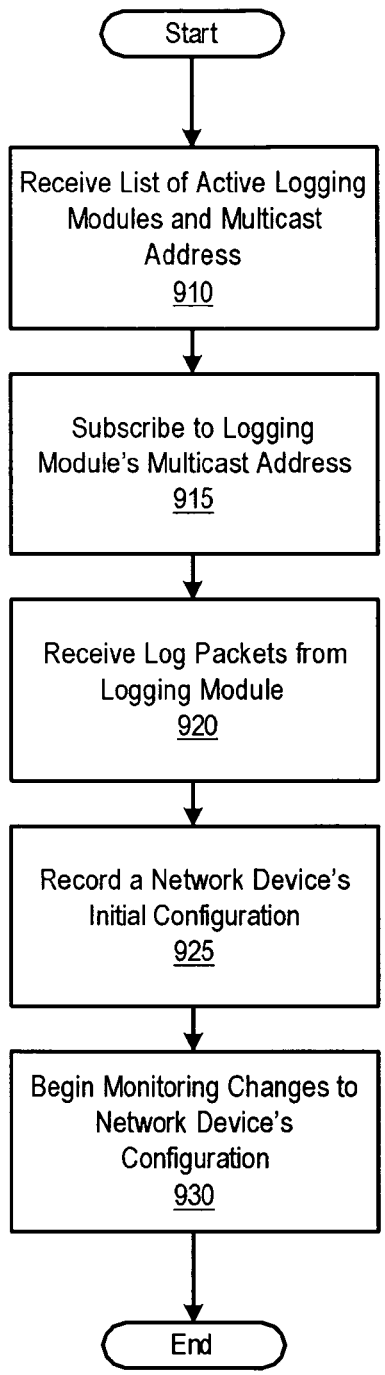
FIG. 9 is a flow diagram illustrating a process for setting up a security monitor according to embodiments of the present invention.

FIG. 9 is a flow diagram illustrating a process for configuring a security monitor according to embodiments of the present invention. At step 910, the security monitor receives a list containing the active logging modules and the multicast address that the security monitor should listen on for the logging modules' transmissions. It will be noted that multiple multicast addresses can be employed (e.g., one for each logging module). The process begins with the security monitor subscribing to a logging module's multicast address in order to receive broadcasts from the logging module (step 915). Alternatively, the logging module's multicast address can be predetermined (e.g., by the manufacturer of such equipment, by a standards body or the like). The security monitor then receives a series of log packets from each logging module (step 920). It will be noted that this is only necessary in the case where the security monitor has no information as to a network device's initial configuration (i.e., after reset) or current configuration. The expected case is one in which a monitored device's initial state is known to the security monitor. Next, an initial configuration of the network device is recorded (step 925), and the security monitor begins monitoring for changes to the configuration of the communications device (step 930).

Figure 10:
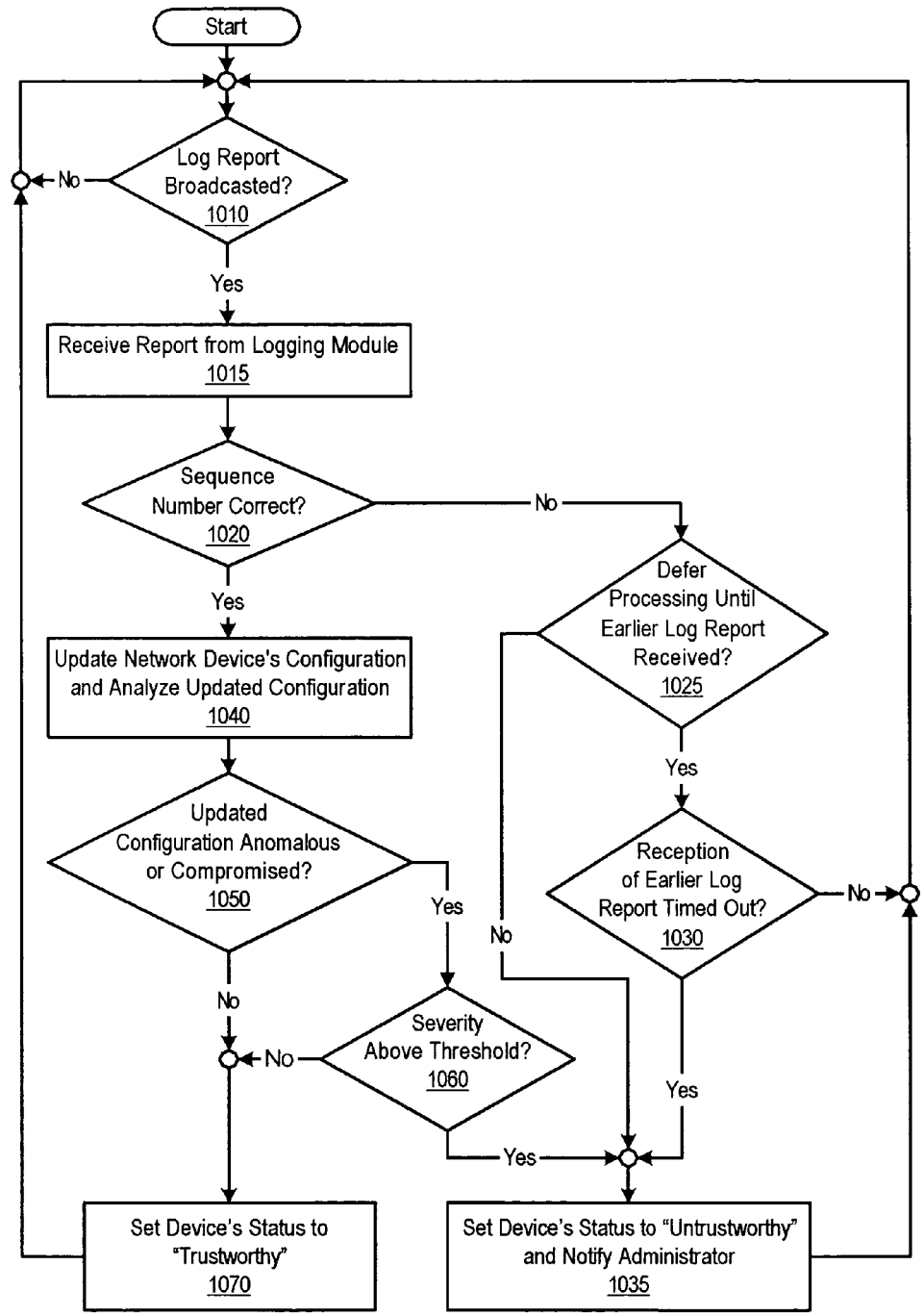
FIG. 10 is a flow diagram illustrating a process for receiving and acting upon changes to the configuration of a network device.

An Example of a Process for Receiving and Acting Upon Changes to the Configuration of a Network Device FIG. 10 is a flow diagram illustrating a process performed by a security monitor in receiving and acting upon changes to a network device's configuration. The process begins with awaiting broadcast of a log report by a logging module on the given multicast address (step 1010). Once transmitted, the log report is received from the network device's logging module by the security monitor (step 1015). A determination is then made as to whether the sequence number received with the log report is the correct (expected) value (step 1020). A sequence number is incorrect if the number is not what is expected in view of the sequence number received with the last broadcast. For example, if the sequence of numbers being used for the broadcasts are consecutive positive integers and the last broadcast was number 53, anything other than 54 for the current broadcast is considered an incorrect sequence number.

If the sequence number is incorrect (step 1020), a determination is made as to whether to defer processing of the log report until the earlier log report(s) are received (step 1025). This is the case in which the security monitor, having received a log report (packet(s)) with a later-than-expected sequence number, defers the processing of log reports (packet(s)) having a later sequence number until the log report (packet(s)) having an earlier sequence number is received. If processing is to be deferred (step 1025), a determination is then made as to whether a timeout for reception of earlier log report has occurred (step 1030). This avoids the security monitor waiting endlessly for the earlier log report. If no timeout has occurred, the process awaits reception of the next log report.

However, if either processing will not be deferred (step 1025) or a timeout has occurred (step 1030), the device's status is set to "untrustworthy" and the administrator notified (step 1035). In this case, it is concluded that the device is in an unsafe state, and the security monitor ceases waiting for the reception of the missing log report(s) (packet(s)).

If the sequence number is correct (step 1020), the configuration of the network device is updated, and the updated configuration analyzed (step 1040). A determination is then made as to whether the network device's updated configuration appears anomalous (i.e., compromised) (step 1050). For example, the security monitor can determine whether a change in the configuration was scheduled and/or whether the change in the configuration corresponds to an expected change in the configuration.

If the updated configuration change appears anomalous or compromised, a determination is made as to whether the severity of the change in the configuration of the network device is above a certain threshold (step 1060). For example, a change may be too minor by itself to cause security concerns. If the severity is above a certain threshold (step 1060), the device's status is set to "untrustworthy" and the administrator notified (step 1035). It will be appreciated that the actions on deciding a node is untrustworthy can further include automatically commanding the nodes that it connects with to disable reception and discontinue transmission to this node If the updated configuration state does not appear anomalous, or if the severity is not above a certain threshold (steps 1050 and 1060), the device's status is set to (or maintained at) a "trustworthy" status (step 1070). The security monitor then returns to awaiting the transmission of log reports (step 1010).

Figure 11:
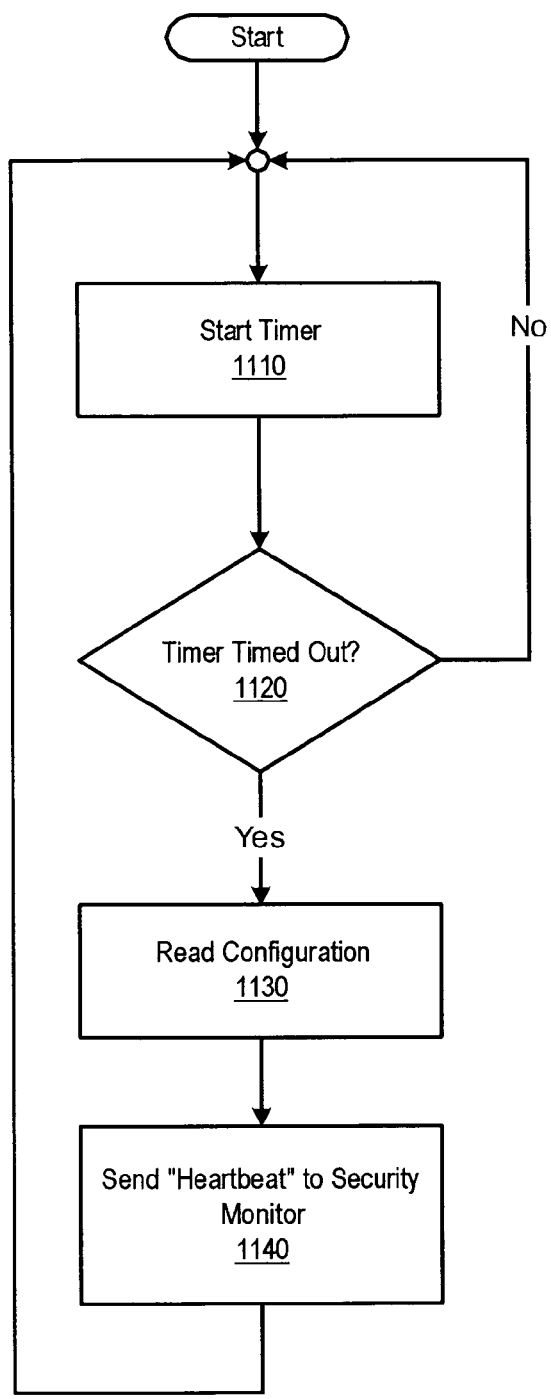
FIG. 11 is a flow diagram illustrating a process for sending a network device's configuration information.

An Example of Processes for Sending and Receiving Configuration Information Regarding a Network Device FIG. 11 is a flow diagram illustrating a process for sending a network device's configuration information on a periodic basis. In this approach, a logging module sends information on a regular basis, as a "heartbeat" of sorts, to a security monitor. This allows the security monitor to easily ascertain whether a given device (and/or its logging module) has become inoperative or otherwise unable to communicate for some reason.

Typically, a heartbeat includes only some minimal amount of information, such as an artificial change (e.g., information such as a "LastHeartBeatTime" can be updated, causing that information to be sent to the security monitor). This is primarily to indicate that updates may have been missed, if nothing is received within some timeout period, while minimizing the amount of information that needs to be conveyed to the security monitor. Thus, complete configuration information is sent periodically only when the configuration information includes a minimal amount of information. This is done in order to avoid using sequence numbers and performing resynchronization operations. However, in other embodiments, all (or a pertinent portion) of the network device's configuration can be sent to the security monitor, regardless of the amount of information being conveyed (e.g., if necessary from a security perspective, or for some other reason).

The security monitor receiving this configuration information compares the configuration information thus received to stored configuration information, and from that comparison makes a determination as to the trustworthiness of the network device. This approach also has the added benefit of being able to identify a compromised or failed network device by detecting a lack of heartbeat. In this scenario, a network device's existence is identified by the security monitor's receipt of configuration information. If the periodic transmission of configuration information ceases, the security monitor detects the cessation (e.g., through the use of a timer), and changes the status of the compromised/failed network device to "untrustworthy". Should the network device's heartbeat return, a decision can then be made as to whether to return its status to "trustworthy" or leave the network device's status in the "untrustworthy" state.

The transmission process begins by starting a timer, which is used to decide when to send the current configuration information (step 1110). The process loops until the timer times out (step 1120). Once the timer times out, the logging module reads the network device's current configuration information (step 1130). The logging module then broadcasts this current configuration to the security monitor (step 1140), and restarts the timer (step 1110).

Figure 12:
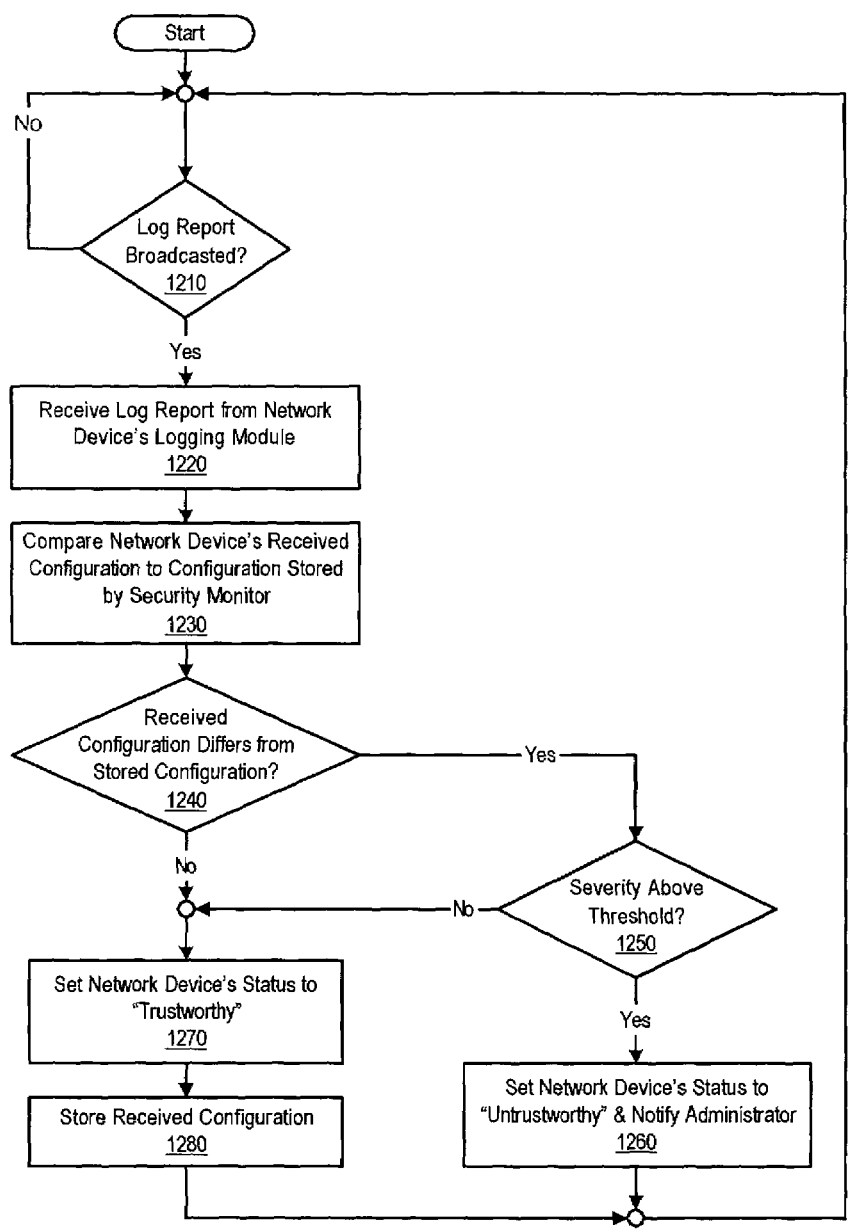
FIG. 12 is a flow diagram illustrating a process for receiving a network device's configuration information.

FIG. 12 is a flow diagram illustrating a process for receiving a network device's configuration information. The process begins with awaiting broadcast of a log report by a logging module on the given multicast address (step 1210). Once transmitted, the log report is received from the network device's logging module by the security monitor (step 1220). The log report received is compared to a log report for the network device stored by the security monitor (step 1230).

If the comparison of the received log report and stored log report indicate that the configuration appears anomalous or the network device appears to be compromised, a determination is made as to whether the severity of the differences between the received and stored configurations are above a certain threshold (step 1250). For example, a change may be too minor by itself to cause security concerns. If the severity is above a certain threshold (step 1250), the device's status is set to "untrustworthy" and the administrator notified (step 1260).

Alternatively, if the received log report does not appear to be anomalous, or if the severity is not above a certain threshold (steps 1240 and 1250), the device's status is set to (or maintained at) a "trustworthy" status (step 1270) and the received log report is stored (and so become the stored log report) (step 1280). The security monitor then returns to awaiting the transmission of log reports (step 1210).

It will be noted that, if no log report has been received for a given network device, the first log report can simply be taken as a known state. In that case, the received log report is stored as the stored log report, for use in comparisons to subsequently-received log reports.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. An apparatus comprising:
   a communications device comprising:
      a subsystem; and
      a logging module, coupled to said subsystem, and configured to detect a change to a configuration of said subsystem of said communications device, and communicate information regarding said change to said configuration of said subsystem of said communications device.

2. The communications device of claim 1, wherein the logging module is further configured to broadcast a data packet using a logging module network address and a logging module communications protocol.

3. The communications device of claim 2, wherein the logging module is further configured to restrict a change to a configuration of the logging module by the subsystem.

4. The communications device of claim 2, wherein the logging module is further configured to communicate the change to the configuration of the subsystem by broadcasting the data packet, wherein the data packet indicates the change to the configuration of the subsystem.

5. The communications device of claim 4, wherein
the logging module is configured to broadcast the change to the configuration of the subsystem to at least one security monitor coupled to the subsystem via a network.

6. The communications device of claim 5, wherein
the security monitor is configured to set the communications device to an "untrustworthy" status in response to receiving the change to the configuration of the subsystem.

7. The communications device of claim 6, wherein
the security monitor is configured to disconnect the communications device from the network in response to the communications device being set to the "untrustworthy" status.

8. The communications device of claim 2, wherein
the logging module is further configured to restrict the subsystem from broadcasting using the logging module network address and the logging module communications protocol.

9. The communications device of claim 2, wherein
the logging module is configured to broadcast a series of data packets,
each of the data packets comprises an index number, and
each of the index numbers is taken from a sequence of numbers.

10. The communications device of claim 2, wherein
the logging module is configured to communicate the change to the configuration of the subsystem when a condition is satisfied.

11. The communications device of claim 10, wherein
the logging module is configured to communicate the change to the configuration of the subsystem when an amount of the change is above a certain threshold.

12. The communications device of claim 10, wherein
the logging module is configured to communicate the change to the configuration of the subsystem when a criticality of the change is above a certain threshold.

13. The communications device of claim 10, wherein
the logging module is configured to communicate the change to the configuration of the subsystem periodically.

14. The communications device of claim 1, wherein
the subsystem is a communications interface.

15. The communications device of claim 14, wherein
the logging module is further configured to restrict a change to a configuration of the logging module by the communications interface.

16. The communications device of claim 14, wherein
the logging module is further configured to broadcast using the communications interface using a logging module network address and a logging module communications protocol.

17. The communications device of claim 16, wherein
the logging module is further configured to restrict a change to a configuration of the logging module by the communications interface.

18. The communications device of claim 16, wherein
the logging module is configured to communicate the change to the configuration of the communications interface by broadcasting the change to the configuration of the communications interface.

19. The communications device of claim 18, wherein
the logging module is configured to broadcast the change to the configuration of the communications interface to at least one security monitor coupled to the communications interface via a network.

20. The communications device of claim 19, wherein
the security monitor is configured to set the communications device to an "untrustworthy" status in response to receiving the change to the configuration of the communications interface.

21. The communications device of claim 20, wherein
the security monitor is configured to disconnect the communications device from the network in response to the communications device being set to the "untrustworthy" status.

22. The communications device of claim 16, wherein
the logging module is further configured to restrict the communications interface from broadcasting using the logging module network address and the logging module communications protocol.

23. The communications device of claim 22, wherein
the logging module is configured to restrict the communications interface from broadcasting a change to the configuration of the communications interface using the logging module network address and the logging module communications protocol.

24. The communications device of claim 16, wherein
the logging module is configured to broadcast using a series of data packets,
each of the data packets comprises an index number, and
each of the index numbers is taken from a sequence of numbers.

25. The communications device of claim 16, wherein
the logging module is configured to communicate the change to the configuration of the communications interface when a condition is satisfied.

26. The communications device of claim 25, wherein
the logging module is configured to communicate the change to the configuration of the communications interface when an amount of the change is above a certain threshold.

27. The communications device of claim 25, wherein
the logging module is configured to communicate the change to the configuration of the communications interface when a criticality of the change is above a certain threshold.

28. The communications device of claim 25, wherein
the logging module is configured to communicate the change to the configuration of the communications interface periodically.

29. The communications device of claim 1, wherein
the logging module is configured to communicate the change to the configuration of the subsystem by broadcasting the change to the configuration of the subsystem.

30. The communications device of claim 29, wherein
the logging module is configured to broadcast the change to the configuration of the subsystem to at least one security monitor coupled to the subsystem via a network.

31. The communications device of claim 30, wherein
the security monitor is configured to set the communications device to an "untrustworthy" status in response to receiving the change to the configuration of the subsystem.

32. The communications device of claim 31, wherein
the security monitor is configured to disconnect the communications device from the network in response to the communications device being set to the "untrustworthy" status.

33. The communications device of claim 1, wherein
the logging module is further configured to broadcast the change to a security monitor.

34. The communications device of claim 33, wherein
the logging module is configured to communicate the change when a condition is satisfied.

35. The communications device of claim 34, wherein
the logging module is configured to communicate the change when an amount of the change is above a certain threshold.

36. The communications device of claim 34, wherein
the logging module is configured to communicate the change when a criticality of the change is above a certain threshold.

37. The communications device of claim 34, wherein
the logging module is configured to communicate the change periodically.

38. The communications device of claim 34, wherein
the subsystem is a communications interface.

39. A method comprising:
detecting a change in a configuration of a subsystem of a communications device wherein a logging module is coupled to said subsystem and said detecting is performed at the logging module; and
communicating information regarding the change comprises causing said logging module to communicate the change information.

40. The method of claim 39, further comprising:
determining the configuration.

41. The method of claim 40, wherein
the information comprises an indication of an occurrence of the change.

42. The method of claim 40, wherein
the information comprises a change made to the configuration.

43. The method of claim 40, further comprising:
executing a process in said logging module of the communications device, wherein the logging process performs the detecting the change and the communicating information regarding the change.

44. The method of claim 43, wherein
the subsystem is a communications interface, and
the executing the process in the logging module comprises executing a logging process.

45. The method of claim 44, wherein the executing a logging process comprises:
executing a logging process in the logging module of the communications device according to a configuration of the logging module.

46. The method of claim 44, wherein the communicating comprises:
broadcasting the information.

47. The method of claim 46, wherein the broadcasting is performed using the communications interface.

48. The method of claim 47, wherein the broadcasting is performed using:
a logging module network address, and
a logging module communications protocol.

49. The method of claim 47, wherein the broadcasting comprises:
broadcasting the information to a security monitoring process executing on a security monitor coupled to the communications interface via a network.

50. The method of claim 49, wherein the security monitoring process comprises:
setting the communications device to an "untrustworthy" status in response to receiving the change to the configuration of the communications interface.

51. The method of claim 50, wherein the security monitoring process comprises:
disconnecting the communications device from the network in response to the communications device being set to the "untrustworthy" status.

52. The method of claim 46, wherein the communicating comprises:
indicating the change to the configuration of the communications interface when a condition is satisfied.

53. The method of claim 52, wherein the communicating comprises:
indicating the change to the configuration of the communications interface when an amount of the change is above a certain threshold.

54. The method of claim 52, wherein the communicating comprises:
indicating the change to the configuration of the communications interface when a criticality of the change is above a certain threshold.

55. The method of claim 52, wherein the communicating is performed periodically.

56. The method of claim 44, further comprising:
executing at least one process in the subsystem according to the configuration of the subsystem.

57. The method of claim 56, wherein the executing the at least one process in the communications interface comprises:
executing a communications process.

58. The method of claim 57, wherein the executing the logging process further comprises:
restricting a change to a configuration of the logging module by the communications process.

59. The method of claim 57, wherein the executing the logging process further comprises:
broadcasting through the communications interface using a logging module network address and a logging module communications protocol.

60. The method of claim 59, wherein the executing the logging process further comprises:
restricting a change to a configuration of the logging module by the communications process.

61. The method of claim 59, wherein the executing the logging process further comprises:
restricting the communications process from broadcasting using the logging module network address and the logging module communications protocol.

62. The method of claim 61, wherein the restricting comprises:
restricting the communications interface from broadcasting a change to the configuration of the communications interface using the logging module network address and the logging module communications protocol.

63. The method of claim 40, wherein the communicating comprises:
broadcasting the information.

64. The method of claim 63, wherein the broadcasting is performed using the subsystem.

65. The method of claim 64, wherein the broadcasting is performed using:
a logging module network address, and
a logging module communications protocol.

66. The method of claim 65, wherein the broadcasting comprises:
  broadcasting the change to the configuration of the subsystem to a security monitoring process executing on a security monitor coupled to the communications device via a network.

67. The method of claim 66, wherein the security monitoring process comprises:
  setting the communications device to an "untrustworthy" status in response to receiving the change to the configuration of the subsystem.

68. The method of claim 66, wherein the security monitoring process comprises:
  disconnecting the communications device from the network in response to the communications device being set to the "untrustworthy" status.

69. The method of claim 63, wherein the communicating comprises:
  indicating the change to the configuration of the subsystem when a condition is satisfied.

70. The method of claim 69 wherein the communicating is performed periodically.

71. A communications device comprising:
  a subsystem;
  a processor, coupled to the subsystem;
  computer readable medium coupled to the processor; and
  computer code, encoded in the computer readable medium, configured to cause the processor to:
    detect a change in a configuration of the subsystem; and
    communicate information regarding the change.

72. The communications device of claim 71, wherein the computer code is further configured to cause the processor to:
  determine the configuration.

73. The communications device of claim 72, wherein the computer code configured to cause the processor to communicate the information regarding the change is further configured to cause the processor to:
  broadcast the information.

74. The communications device of claim 73, wherein the computer code configured to cause the processor to communicate the information regarding the change is further configured to cause the processor to:
  indicate the change to the configuration of the subsystem when a condition is satisfied.

75. The communications device of claim 73, wherein the computer code configured to cause the processor to communicate broadcast the information is configured to use:
  a logging module network address, and
  a logging module communications protocol.

76. The communications device of claim 75, wherein the computer code configured to cause the processor to communicate broadcast the information is further configured to cause the processor to:
  broadcast the change to the configuration of the subsystem to a security monitoring process executing on a security monitor coupled to the communications device via a network.

77. The communications device of claim 72, wherein the computer code is further configured to cause the processor to:
  execute a process in a logging module of the communications device, wherein the logging process performs the detecting the change and the communicating information regarding the change.

78. The communications device of claim 77, wherein the computer code configured to cause the processor to execute the process in the logging module of the communications device is further configured to cause the processor to:
  execute a logging process, wherein
    the subsystem is a communications interface.

79. The communications device of claim 78 wherein the computer code configured to cause the processor to communicate the information regarding the change is further configured to cause the processor to:
  broadcast the information.

80. The communications device of claim 79, wherein the computer code configured to cause the processor to communicate the information regarding the change is further configured to cause the processor to:
  indicate the change to the configuration of the communications interface when a condition is satisfied.

81. The communications device of claim 78, wherein the computer code is further configured to cause the processor to:
  execute at least one process in the subsystem according to the configuration of the subsystem.

82. The communications device of claim 81, wherein the computer code configured to cause the processor to execute the at least one process in the subsystem according to the configuration of the subsystem is further configured to cause the processor to:
  execute a communications process.

83. The communications device of claim 82, wherein the computer code configured to cause the processor to execute the logging process is further configured to cause the processor to:
  broadcast through the communications interface using a logging module network address and a logging module communications protocol.

84. A computer program product comprising:
  a first set of instructions, executable on a computer system, configured to detect a change in a configuration of a subsystem of a communications device;
  a second set of instructions, executable on the computer system, configured to communicate information regarding the change; and
  computer readable media, wherein the computer program product is encoded in the computer readable media.

85. The computer program product of claim 84, further comprising:
  a third set of instructions, executable on the computer system, configured to determine the configuration.

86. The computer program product of claim 85, wherein the second set of instructions comprises:
  a first subset of instructions, executable on the computer system, configured to broadcast the information.

87. The computer program product of claim 86, wherein the second set of instructions comprises:
  a second subset of instructions, executable on the computer system, configured to indicate the change to the configuration of the subsystem when a condition is satisfied.

88. The computer program product of claim 86, wherein the second set of instructions use:
  a logging module network address, and
  a logging module communications protocol.

89. The computer program product of claim 88, wherein the second set of instructions comprises:
  a third subset of instructions, executable on the computer system, configured to broadcast the change to the configuration of the subsystem to a security monitoring process executing on a security monitor coupled to the communications device via a network.

90. The computer program product of claim 88, further comprising:
- a fourth set of instructions, executable on the computer system, configured to execute a process in a logging module of the communications device, wherein the logging process performs the detecting the change and the communicating information regarding the change.

91. The computer program product of claim 90, wherein the fourth set of instructions comprises:
- a first subset of instructions, executable on the computer system, configured to execute a logging process, wherein
  the subsystem is a communications interface.

92. The computer program product of claim 91, wherein the second set of instructions comprises:
- a first subset of instructions, executable on the computer system, configured to broadcast the information.

93. The computer program product of claim 92, wherein the second set of instructions comprises:
- a second subset of instructions, executable on the computer system, configured to indicate the change to the configuration of the subsystem when a condition is satisfied.

94. The computer program product of claim 91, further comprising:
- a fifth set of instructions, executable on the computer system, configured to execute at least one process in the subsystem according to the configuration of the subsystem.

95. The computer program product of claim 94, wherein the fifth set of instructions comprises:
- a first subset of instructions, executable on the computer system, configured to execute a communications process.

96. The computer program product of claim 95, wherein the first subset of the fourth set of instructions comprises:
- a first sub-subset of instructions, executable on the computer system, configured to broadcast through the communications interface using a logging module network address and a logging module communications protocol.

97. An apparatus comprising:
- means for detecting a change in a configuration of a subsystem of a communications device; and
- means for communicating information regarding the change.

98. The apparatus of claim 97, further comprising:
- means for determining the configuration.

99. The apparatus of claim 98, wherein the means for communicating comprises:
- means for broadcasting the information.

100. The apparatus of claim 99, wherein the means for communicating comprises:
- means for indicating the change to the configuration of the subsystem when a condition is satisfied.

101. The apparatus of claim 99, wherein the means for broadcasting is configured to use:
- a logging module network address, and
- a logging module communications protocol.

102. The apparatus of claim 101, wherein the means for broadcasting comprises:
- means for broadcasting the change to the configuration of the subsystem to a security monitoring process executing on a security monitor coupled to the communications device via a network.

103. The apparatus of claim 98, further comprising:
- means for executing a logging process in a logging module of the communications device, wherein the logging process performs the detecting the change and the communicating information regarding the change.

104. The apparatus of claim 103, wherein
- the subsystem is a communications interface, and
- the means for executing the process in the logging module comprises means for executing a logging process.

105. The apparatus of claim 104, wherein the means for communicating comprises:
- means for broadcasting the information.

106. The apparatus of claim 105, wherein the means for communicating comprises:
- means for indicating the change to the configuration of the communications interface when a condition is satisfied.

107. The apparatus of claim 104, further comprising:
- means for executing at least one process in the subsystem according to the configuration of the subsystem.

108. The apparatus of claim 107, wherein the means for executing the at least one process in the communications interface comprises:
- means for executing a communications process.

109. The apparatus of claim 108, wherein the means for executing the logging process further comprises:
- means for broadcasting through the communications interface using a logging module network address and a logging module communications protocol.

110. The method of claim 46, wherein the broadcasting comprises:
- sending a series of data packets, wherein
  each of the data packets comprises an index number and
  each of the index numbers is taken from a sequence of numbers.

* * * * *